(12) United States Patent
Suzuki et al.

(10) Patent No.: US 6,400,489 B1
(45) Date of Patent: Jun. 4, 2002

(54) SOLID-STATE DISPLACEMENT ELEMENT, OPTICAL ELEMENT, AND INTERFERENCE FILTER

(75) Inventors: Masayuki Suzuki; Yuichi Ishida; Naomi Nagasawa; Takaaki Ami; Teiichiro Nishimura, all of Kanagawa (JP)

(73) Assignee: Sony Corporation (JP)

( * ) Notice: Subject to any disclaimer, the term of this patent is extended or adjusted under 35 U.S.C. 154(b) by 146 days.

(21) Appl. No.: 09/610,583

(22) Filed: Jul. 5, 2000

(30) Foreign Application Priority Data

Jul. 6, 1999 (JP) .......................... P11-191834

(51) Int. Cl.$^7$ ................................. B02F 1/00
(52) U.S. Cl. ............... 359/241; 252/582; 204/157.15; 428/704
(58) Field of Search .............. 252/582; 428/704; 204/157.15; 359/241

(56) References Cited

U.S. PATENT DOCUMENTS 5,334,629 A * 8/1994 Zirino .................... 252/500
5,436,372 A * 7/1995 Yoshida et al. ........... 546/326

FOREIGN PATENT DOCUMENTS

| JP | 02-131376 | 5/1990 |
| JP | 04-127885 | 4/1992 |
| JP | 05-110153 | 4/1993 |
| JP | 06-125120 | 5/1994 |

* cited by examiner

Primary Examiner—Robert Dawson
Assistant Examiner—Marc S. Zimmer
(74) Attorney, Agent, or Firm—Ronald P. Kananen; Rader, Fishman & Grauer PLLC

(57) ABSTRACT

A solid-state displacement element includes an inorganic layered compound having a layered structure and an organic substance inserted between layers of the inorganic layered compound. The solid-state displacement element expands or contracts in the lamination direction of the inorganic layered compound when irradiated with controlling light. An optical element and an interference filter using the same principle of expansion or contraction as that in the solid-state displacement element are also disclosed.

24 Claims, 15 Drawing Sheets

FIG. 2
(A) 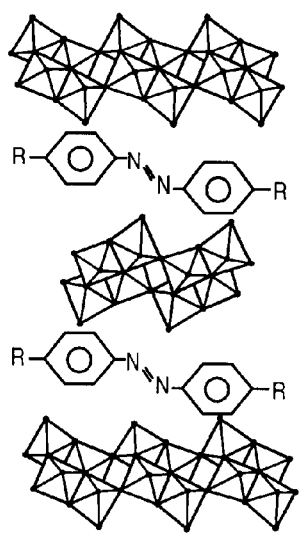  LIGHT : hν 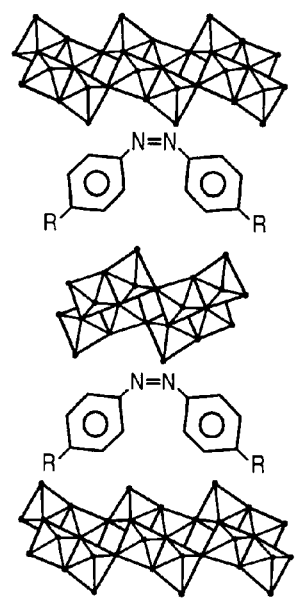 (B)

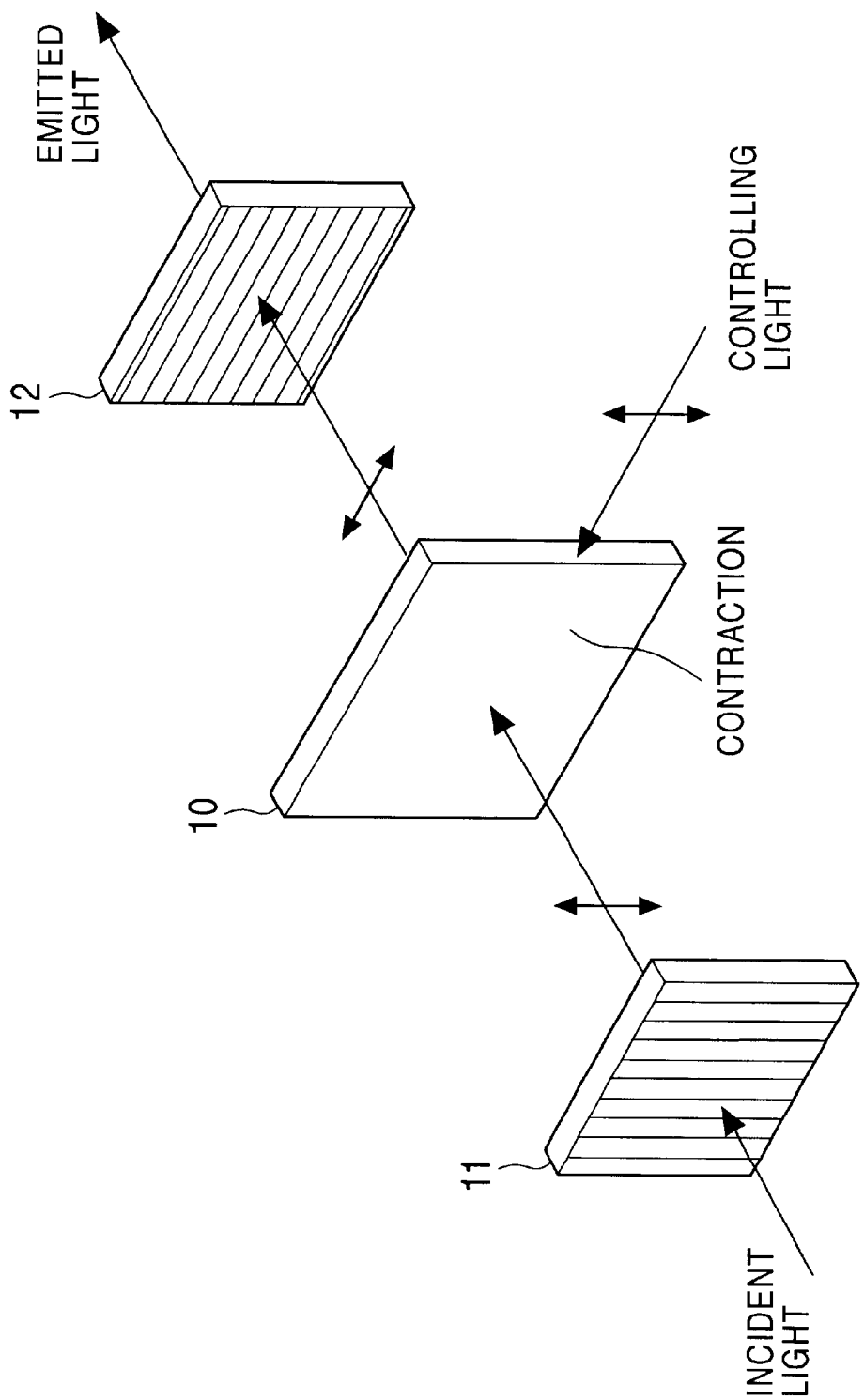

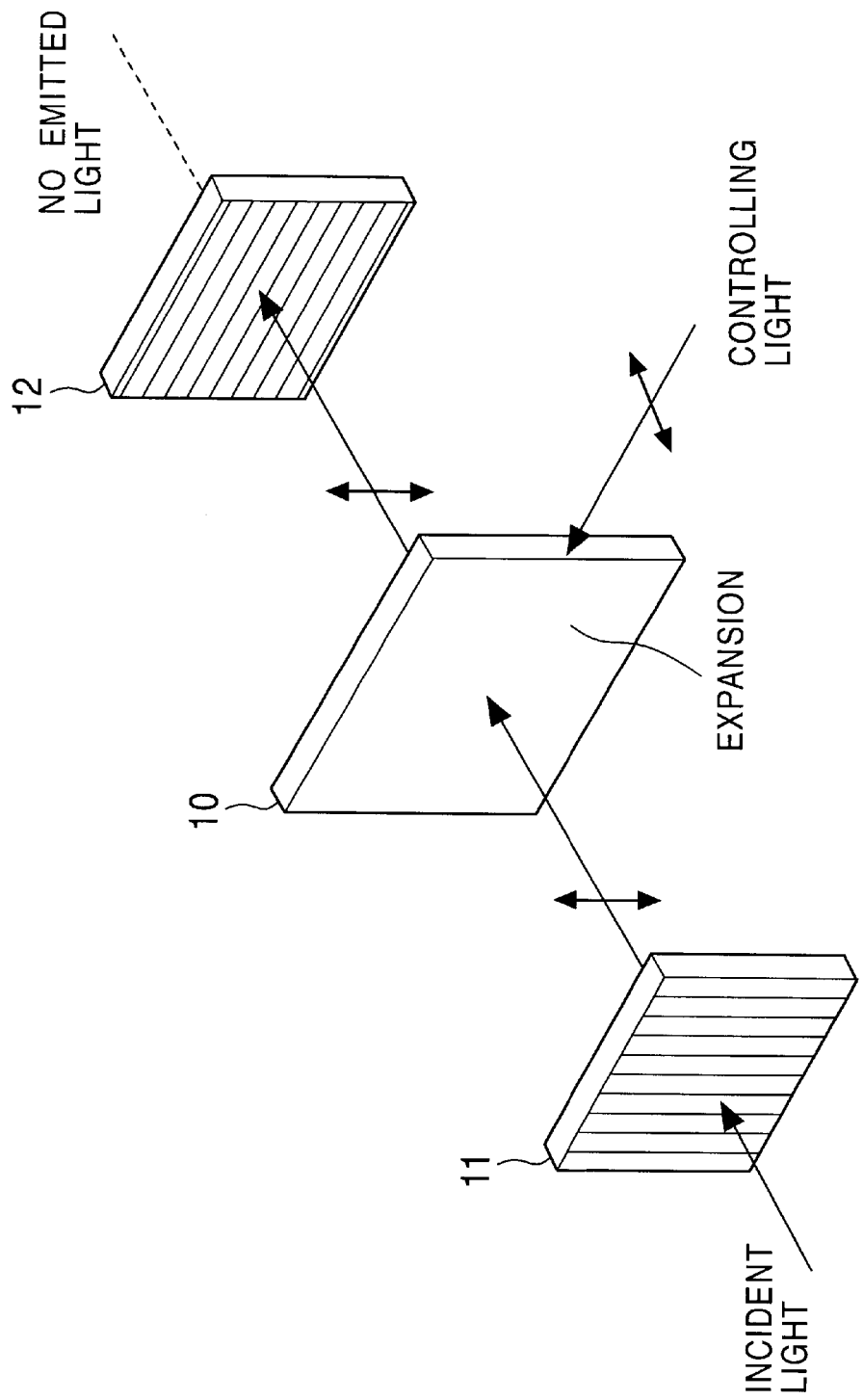

CONTRACTION

EXPANSION

SOLID-STATE DISPLACEMENT ELEMENT, OPTICAL ELEMENT, AND INTERFERENCE FILTER

BACKGROUND OF THE INVENTION

1. Field of the Invention

The present invention relates to solid-state displacement elements based on a so-called "intercalation phenomenon", optical elements to which such solid-state displacement elements are applied, and interference filters having solid-state displacement thin films which are fabricated based on the intercalation phenomenon.

2. Description of the Related Art

Research is being carried out diligently on displacement elements in which organic substances are inserted between layers of inorganic layered compounds having layered structures because it is expected that the displacement elements will bring about great advances in the highly advanced mechatronics field, such as for future intelligent robots and microelectronics. Herein, the layered structure refers to a structure in which layers, each composed of densely arranged atoms that are strongly bonded by covalent bonds and the like, are stacked in parallel by weak bonding forces, such as van der Waals' forces, and the inorganic layered compound refers to an inorganic compound having such a structure. Such displacement elements are fabricated based on an intercalation phenomenon. Herein, the intercalation phenomenon refers to a phenomenon in which organic substances corresponding to electron donors or electron acceptors are incorporated or inserted between layers of an inorganic layered compound.

Conventional displacement elements or actuators can be classified according to the structure or the form thereof into, for example, eight groups, i.e., (1) piezoelectric ceramics, (2) polymer gels, (3) shape memory alloys, (4) hydrogen-storing alloys, (5) elements using fluid pressure, (6) electrostatic elements, (7) magnetostrictors, and (8) optical/piezooptical elements.

All of the above techniques are generally well known today. The most important physical properties of the displacement elements or the actuators include displacement (expansion and contraction), generated force, and response speed (control speed). If the above three characteristics can be simultaneously satisfied, that is, if an increase in displacement, an increase in generated force, and shortening of response speed are achieved, development of materials, devices, and various elements will greatly advance. However, under the existing circumstances, it is difficult to obtain displacement elements or actuators which simultaneously satisfy the three characteristics.

For example, although piezoelectric ceramics have excellent generated force and high response speed, the displacement (expansion rate) thereof is 1% or less. Currently, by combining the high-speed response thereof with ultrasonic techniques, ultrasonography, fish detectors, ultrasonic motors, etc. are practically used. However, examples using the displacement are limited to very few applications, such as high-precision actuators which are used for positioning probes of scanning tunneling microscopes (STMs) and atomic force microscopes (AFMs).

Although some polymer gels have a displacement (expansion rate) of several tens of percent to several hundreds of percent, the generated force thereof is significantly low and it is difficult to move heavy objects. Furthermore, it is not always easy to control expansion or contraction. Additionally, since the polymer gels are based on high polymers, the polymer gels are easily affected by heat and are greatly dependent on the operating environment.

Shape memory alloys recover their original shapes by heating after being deformed at low temperatures and, in principle, exhibit thermoelastic martensitic transformation. Therefore, although irreversible plastic deformation does not occur, high/low temperature controlling is required for the use thereof, and twin deformation by lattices is used, and therefore, a large displacement cannot be expected.

Although hydrogen-storing alloys are reversible, the hydrogen-storing alloys are based on the occlusion reaction due to the grain boundary diffusion of atomic hydrogen, thus being disadvantageous with respect to temperatures in the operating environment and responsiveness. Furthermore, the greatest challenge is elimination of heat of the reaction, and it is impractical to obtain small displacement elements or actuators.

Displacement elements or actuators which use fluid pressure are usually composed of composite materials including rubber and fibers, and are driven by air pressure or liquid pressure using the stretching properties thereof. Although such displacement elements or actuators are believed to be suitable for movement in analog form, it is difficult to perform micro-fabrication, and there remain problems with respect to the reduction in size and the integration of the displacement elements or the actuators.

Electrostatic elements are generally fabricated using the fine patterning processes which have been developed for silicon semiconductor devices, and the static electricity Coulomb force is used. Therefore, while the electrostatic elements are advantageous with respect to fine patterning of displacement elements or actuators, there remain problems with respect to the generated force. Furthermore, the greatest challenge is reliability, and because sliding units are included, deterioration easily occurs with time. The electrostatic elements are also easily affected by static electricity.

Magnetostrictors generally use a giant magnetostrictive effect, and materials having a strain of approximately $10^{-3}$ at room temperature (e.g., Tb—Dy—Fe alloys) are known. The magnetostrictors have advantages with respect to displacement, generated force, small mass, etc. in comparison with piezoelectric elements. However, a serious drawback is that an external magnetic field is required for operating a magnetostrictor, and it is a challenge to provide a technique for forming a magnetic circuit in the vicinity of the magnetostrictor. In view of the above, it is difficult to reduce the size and increase the density of the magnetostrictors in comparison with voltage-driven piezoelectric elements.

As optical/piezooptical elements, for example, PLZT exhibiting a photovoltaic effect is known. In the optical/piezooptical elements, electromotive forces are produced by light irradiation based on pyroelectricity of the optical/piezooptical elements, and accordingly the inverse piezoelectric effect occurs, resulting in strain. Although noncontact operation is an advantage, since displacement is caused by inverse piezoelectricity through pyroelectricity, a large displacement cannot be expected, and poling treatment (voltage application) is required to induce displacement, thus giving rise to a problem in the process.

Preferably, displacement elements or actuators include constituents, all of which are solid state. Many organic substances are in a liquid state by themselves, and it is necessary to introduce them into solids without impairing the function of the organic substances. For that purpose, from the point of view of crystallography, it is best that a displacement element or an actuator has an organic molecule as a unit of a crystal structure. By employing such a structure, it is possible to completely prevent atoms and molecules from going in and out in response to the control of the displacement element or the actuator. In order to improve the generated force of the displacement element or the actuator, it is desirable that the displacement element or the actuator has a crystal skeleton similar to that of an inorganic compound. A so-called "intercalation compound" simultaneously satisfies all the conditions described above, in which an organic substance is inserted (intercalated) between layers of an inorganic layered compound having a layered structure. The intercalation compound has both the toughness of the inorganic compound and the flexibility of the organic substance, and is a material which is similar to a biological muscle.

Solid-state displacement elements or actuators using intercalation compounds have been known, for example, from Japanese Unexamined Patent Application Publication Nos. 5-110153, 6-125120, 2-131376, and 4-127885.

In the solid-state displacement element disclosed in Japanese Unexamined Patent Application Publication No. 5-110153 or 6-125120, external electrodes are provided, and an electric field generated by applying a voltage to such electrodes is applied to an intercalation compound in which an organic substance is inserted into a layered compound, and the alignment angle of the inserted organic substance is changed, and thus the displacement element is displaced. However, since the electric field must be applied from outside in order to displace the displacement element, the construction of the means for forming the electric field becomes complex, which is disadvantageous. In the above two unexamined patent application publications, no mention or suggestion is made with respect to techniques for controlling the displacement and operation of the solid-state displacement elements based on light.

Japanese Unexamined Patent Application Publication No. 2-131376 discloses an actuator which includes graphite intercalation compound layers as expansion portions, and the expansion or contraction of the expansion portions is used for producing shape displacement. Specifically, cubical expansion resulting from the intercalation phenomenon is used as a driving force, and intercalants between the graphite intercalation compound layers are electrically and thermally added or removed, and resulting expansion and contraction of the graphite intercalation compound layers are used to construct the actuator. Japanese Unexamined Patent Application Publication No. 4-127885 also discloses an electrochemical actuator, in which cubical expansion resulting from the intercalation phenomenon is used as a driving force. Specifically, a compound oxide containing $Ag_{0.7}V_2O_5$ and vanadium oxide is used as positive/negative poles, $4AgI-Ag_2WO_4$ is used as a silver-ion conductive solid electrolyte, and at least one of the poles exhibits a reversible volumetric change in response to an electrochemical oxidation-reduction reaction.

However, in the above two unexamined patent application publications, no mention or suggestion is made with respect to solid-state displacement elements which use a change in the state of organic substances inserted between inorganic layered compounds as a driving force or with respect to techniques for controlling the displacement and operation of the solid-state displacement elements based on light.

SUMMARY OF THE INVENTION

Accordingly, it is an object of the present invention to provide a solid-state displacement element in which displacement (expansion and contraction) can be caused by a very simple method or construction, an optical element using such a solid-state displacement element, and an interference filter provided with a solid-state displacement thin film in which displacement (expansion and contraction) can be caused by a very simple method or construction.

In accordance with the present invention, a solid-state displacement element includes an inorganic layered compound having a layered structure and an organic substance inserted between layers of the inorganic layered compound. When controlling light is irradiated, the solid-state displacement element expands or contracts in the lamination direction of the inorganic layered compound.

In accordance with the present invention, an optical element includes an inorganic layered compound having a layered structure and an organic substance inserted between layers of the inorganic layered compound. When controlling light is applied to the optical element, the optical element expands or contracts in the lamination direction of the inorganic layered compound, thus modulating the polarization of transmitted light passing through the optical element.

Preferably, the transmitted light passing through the optical element enters substantially in the lamination direction of the inorganic layered compound constituting the optical element, and is linearly polarized.

In accordance with the present invention, an interference filter includes a multilayered film composed of a dielectric material and a solid-state displacement thin film disposed between layers of the multilayered film. The interference filter transmits or reflects light in a predetermined wavelength region. The solid-state displacement thin film includes an inorganic layered compound having a layered structure and an organic substance inserted between layers of the inorganic layered compound. When controlling light is applied to the interference filter, the solid-state displacement thin film expands or contracts in the lamination direction of the inorganic layered compound, and a dielectric constant tensor thereof changes, and thus the wavelength region of light passing through or reflected from the interference filter changes.

The solid-state displacement thin film may be disposed between layers of the multilayered film or on an outermost surface of the multilayered film. The number of the solid-state displacement thin film disposed between layers of the multilayered film is not limited to one, and at least two solid-state displacement thin films may be disposed.

In the solid-state displacement element, the optical element, or the interference filter (hereinafter sometimes referred to as "the solid-state displacement element or the like") of the present invention, preferably, the organic substance is composed of an organic compound in which the arrangement in the solid-state displacement element or the like can be changed in the direction of an electric field of the controlling light, and the solid-state displacement element or the like expands or contracts in the lamination direction of the inorganic layered compound in response to variations in the arrangement of, for example, a main chain of the organic compound. In such a case, preferably, the controlling light is applied to the solid-state displacement element or the like in a direction substantially perpendicular to the lamination direction of the inorganic layered compound. However, the incident angle of the controlling light entering the solid-state displacement element or the like is not limited to substantially perpendicular. Herein, "substantially perpendicular" means that the incident angle of the controlling light toward the solid-state displacement element or the like is not necessarily strictly perpendicular. Alternatively, when controlling light which is linearly polarized is applied to the solid-state displacement element or the like in the direction substantially perpendicular to the lamination direction of the inorganic layered compound, the solid-state displacement element or the like preferably expands or contracts in the lamination direction of the inorganic layered compound depending on the direction of the electric field of the linearly polarized light. That is, preferably, the expansion state of the solid-state displacement element or the like is varied by changing the direction of the electric field of the linearly polarized light in the controlling light applied to the solid-state displacement element or the like.

Alternatively, in the solid-state displacement element or the like of the present invention, preferably, the organic substance is composed of an organic compound in which the molecular structure or the conformation can be changed depending on the wavelength of the irradiated controlling light, and the solid-state displacement element or the like expands or contracts in the lamination direction of the inorganic layered compound in response to variations in the structure or the conformation of the organic compound. In such a case, preferably, when controlling light having a first wavelength (for example, a. wavelength of less than 500 nm) is applied to the solid-state displacement element or the like, the solid-state displacement element or the like expands or contracts in the lamination direction of the inorganic layered compound to be in a first expansion state, and when controlling light having a second wavelength (for example, a wavelength of 500 nm or more) is applied to the solid-state displacement element or the like, the solid-state displacement element or the like expands or contracts in the lamination direction of the inorganic layered compound to be in a second expansion state that is different from the first expansion state, in which the solid-state displacement element or the like remains in the first expansion state until the controlling light having the second wavelength is applied to the solid-state displacement element, and the solid-state displacement element or the like remains in the second expansion state until the controlling light having the first wavelength is applied to the solid-state displacement element or the like, namely, the solid-state displacement element or the like may be provided with a memory function. Depending on the organic substance, when the controlling light is applied to the solid-state displacement element or the like, the solid-state displacement element or the like expands or contracts in the lamination direction of the inorganic layered compound to be in the first expansion state, and when the controlling light is not applied to the solid-state displacement element or the like, the solid-state displacement element or the like expands or contracts in the lamination direction of the inorganic layered compound to be in the second expansion state that is different from the first expansion state. Additionally, the controlling light may enter the solid-state displacement element or the like in any direction, and for example, the controlling light may be applied to the solid-state displacement element or the like in a direction substantially perpendicular to the lamination direction of the inorganic layered compound.

In the solid-state displacement element or the like of the present invention, preferably, the organic substance is composed of at least one organic compound selected from the group consisting of an organic compound having at least one of an aliphatic carbon—carbon bond, an aromatic ring, and a heterocyclic ring, in which at least a part of hydrogen atoms directly bonded to any one of carbon atoms may be replaced by nitrogen or sulfur, and an organic compound in which at least a part of hydrogen atoms directly bonded to carbon atoms constituting a carbon compound is replaced by nitrogen or sulfur. More preferably, the organic substance is composed of at least one organic compound selected from the group consisting of a chiral liquid crystal, a phenylpyrimidine-based liquid crystal, a phenylpyridine-based liquid crystal, an amine-based liquid crystal, a biphenylpyrimidine-based liquid crystal, an azobenzene-based compound, a porphyrin-based compound, an anthraquinone-based compound, a spiropyran-based compound, a diarylethene-based compound, a stilbene-based compound, a fulgide-based compound, urea [CO(NH$_2$)$_2$], and carbon disulfide (CS$_2$). Alternatively, more preferably, the organic substance is composed of an organic compound in which the conformation or the molecular structure can be changed. Alternatively, preferably, the organic substance is composed of an organic compound having a polar functional group. More specifically, the organic substance is preferably composed of an organic compound in which at least one polar functional group (e.g., —NH$_2$, —NR$_2$, —NPh$_2$, and —SO$_3$H) is bonded to at least one of carbon atoms constituting the organic substance, wherein R is an alkyl group, and Ph is a phenyl group.

In the solid-state displacement element or the like of the present invention, examples of the organic compound in which the arrangement in the solid-state displacement element or the like can be changed in the direction of an electric field of the irradiated controlling light include a chiral liquid crystal represented by the chemical formula 1 below, a phenylpyrimidine-based liquid crystal represented by the chemical formula 2 below, a phenylpyridine-based liquid crystal represented by the chemical formula 3 below, an amine-based liquid crystal represented by the chemical formula 4 below, and a biphenylpyrimidine-based liquid crystal represented by the chemical formula 5 below.

[Chemical Formula 1]

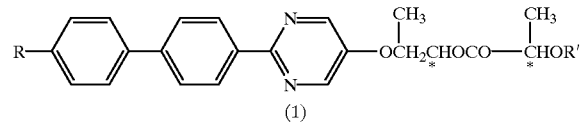

(1)

[Chemical Formula 2]

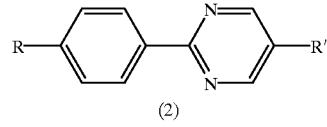

(2)

[Chemical Formula 3]

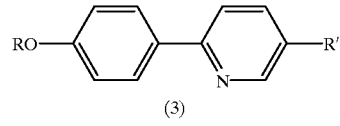

(3)

[Chemical Formula 4]

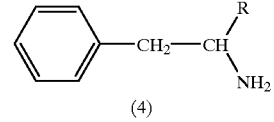

(4)

-continued

[Chemical Formula 5]

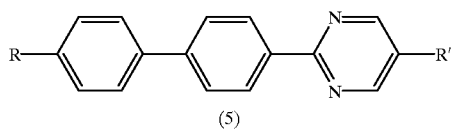

(5)

On the other hand, examples of the organic compound in which the molecular structure or the conformation can be changed depending on the wavelength of the irradiated controlling light include an azobenzene-based compound represented by the chemical formula 6 below, a porphyrin-based compound represented by the chemical formula 7 below, an anthraquinone-based compound including quinizarine represented by the chemical formula 8 below, a spiropyran-based compound including spirobenzopyran represented by the chemical formula 9 below, a diarylethene-based compound including diarylethene represented by the chemical formula 10 below, a stilbene-based compound represented by the chemical formula 11 below, and a fulgide-based compound represented by the chemical formula 12 below. Additionally, a change in the molecular structure or the conformation means that photoisomerization occurs between a cis-form and a trans-form due to optical pumping, or that a new combination occurs or a combination splits in a molecule due to light irradiation.

[Chemical Formula 6]

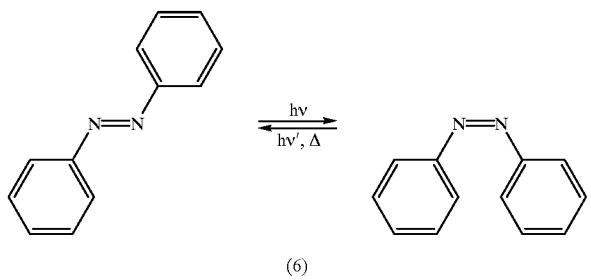

(6)

[Chemical Formula 7]

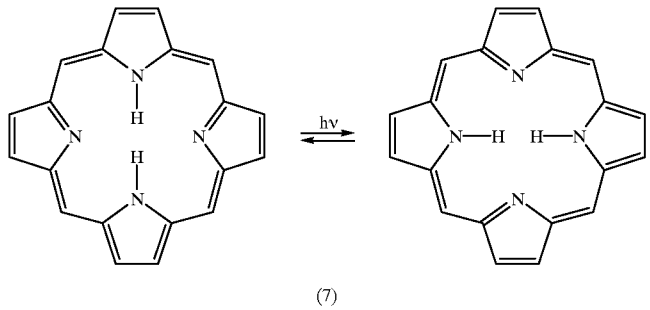

(7)

[Chemical Formula 8]

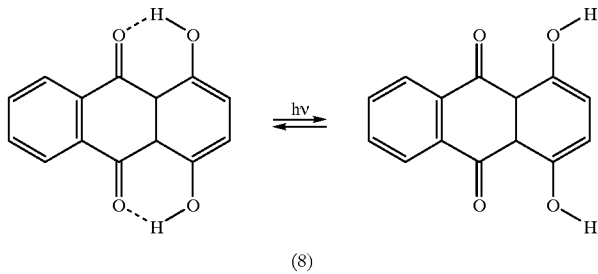

(8)

[Chemical Formula 9]

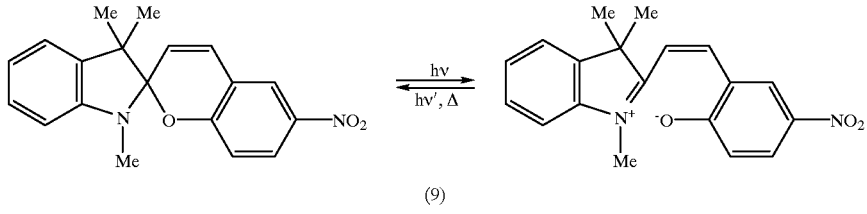

(9)

[Chemical Formula 10]

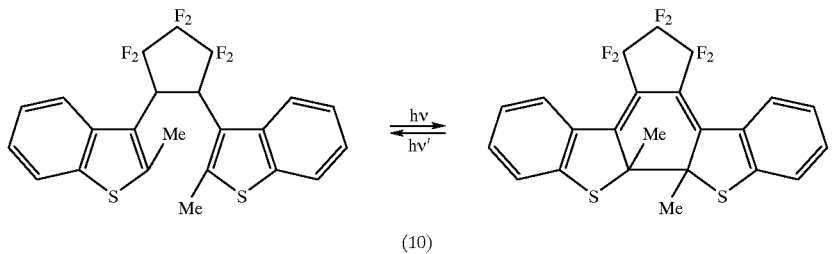

(10)

[Chemical Formula 11]

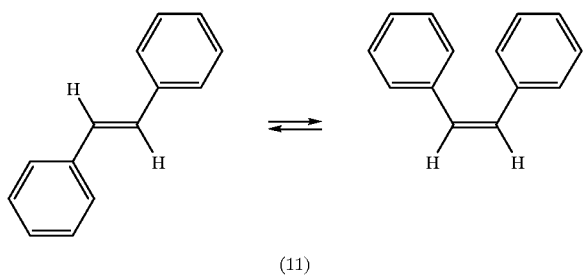

(11)

[Chemical formula 12]

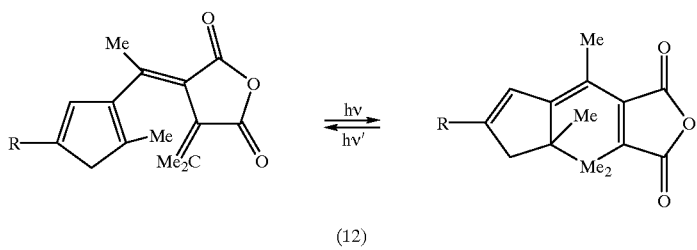

(12)

In the solid-state displacement element or the like of the present invention, the inorganic layered compound, or the inorganic layered compound as a starting material before the organic substance is inserted between the layers, may be composed of at least one inorganic layered compound selected from the group consisting of a layered perovskite-type niobium-based compound, such as $KLaNb_2O_7$, $KCa_2Nb_3O_{10}$, $RbCa_2Nb_3O_{10}$, $CsCa_2Nb_3O_{10}$, or $KNaCa_2Nb_4O_{13}$; a layered perovskite-type copper-based compound, such as $Bi_2Sr_2CaCu_2O_8$ or $Bi_2Sr_2Ca_2Cu_3O_{10}$; a layered titanoniobate, such as $KTiNbO_5$, $K_2Ti_4O_9$, or $K_4Nb_6O_{17}$; a layered rock salt-type oxide, such as $LiCoO_2$ or $LiNiO_2$; a bronze-based compound in a transition metal oxide, such as $MoO_3$, $V_2O_5$, $WO_3$, or $ReO_3$; a transition metal oxychloride, such as, FeOCl, VOCl, or CrOCl; a layered polysilicate, such as $Na_2O$—$4SiO_2$—$7H_2O$; a layered clay mineral, such as smectite, vermiculite, or mica; a hydrotalcite, such as $Mg_6Al_2(OH)_{16}CO_3$—$H_2O$; a transition metal chalcogenide, such as $TaSe_2$, $TaS_2$, $MoS_2$, or $VSe_2$; a zirconium phosphate, such as $Zr(HPO_4)_{2n}H_2O$; and graphite. Additionally, the various compounds described above may have compositions that slightly deviate from stoichiometric compositions.

In order to generate the controlling light, any means may be used, for example, a laser.

Among the three important factors, i.e., displacement (expansion and contraction), generated force, and response speed (control speed), which are required for the solid-state displacement element, the optical element, or the interference filter, in particular, the present invention has a great advantage with respect to the generated force and the response speed. That is, in order to improve the generated force, the inorganic layered compound having the layered structure is used, and the superior response speed can be achieved because the organic substance inserted (intercalated) between the layers of the inorganic layered compound sensitively responds to the controlling light irradiated from outside. Moreover, since the expansion and contraction of the solid-state displacement element, the optical element, or the interference filter are controlled by light irradiation, the control system can be simplified.

BRIEF DESCRIPTION OF THE DRAWINGS

FIGS. 2A and 2B are schematic diagrams which illustrate, in a solid-state displacement element or the like of the present invention, a principle of expansion or contraction in the lamination direction of an inorganic layered compound when controlling light is applied;

FIG. 11 is a schematic diagram of an optically-controlled device provided with an optical element of the present invention;

FIG. 12 is a schematic diagram of an optically-controlled device provided with an optical element of the present invention;

DESCRIPTION OF THE PREFERRED EMBODIMENTS

Figure 1:
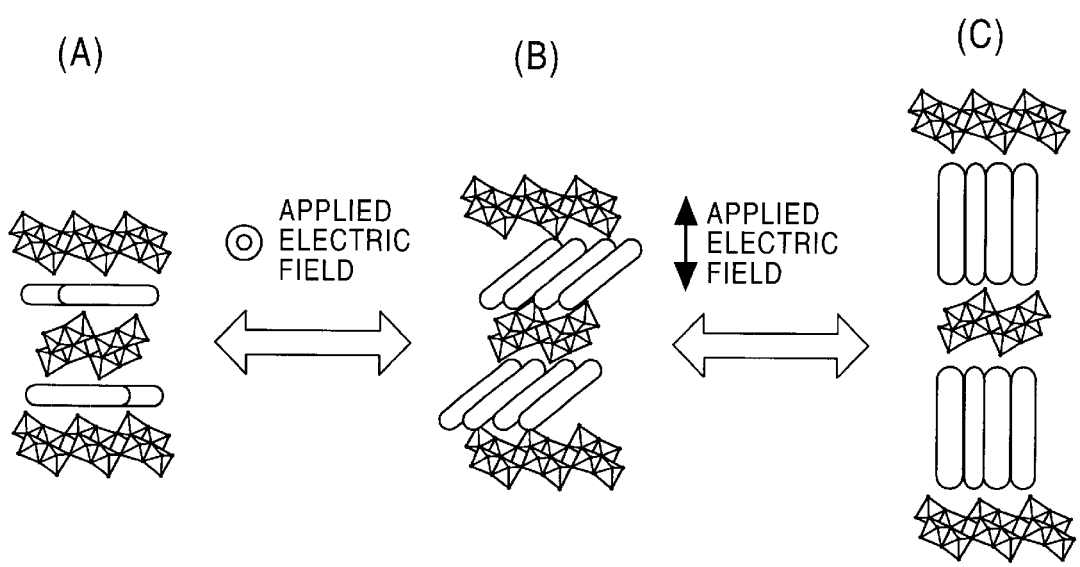
FIGS. 1A to 1C are schematic diagrams which illustrate, in a solid-state displacement element or the like of the present invention, a principle of expansion or contraction in the lamination direction of an inorganic layered compound when controlling light is applied.

With reference to FIGS. 1A to 1C and FIGS. 2A and 2B, in a solid-state displacement element or the like of the present invention, the principle of expansion or contraction in the lamination direction of an inorganic layered compound when controlling light is applied will be described. In the drawings, each zigzag chain of two octahedral sub-lattices represents each layer of the inorganic layered compound, and rounded-end rods represent organic substances. Chemical formulae merely represent organic substances. Depending on the organic substance, the state shown in FIG. 2A may be, for example, a trans-form or a cis-form, and the state shown in FIG. 2B may be, for example, a cis-form or a trans-form.

An example of the case where the organic substance is composed of an organic compound in which the arrangement in the solid-state displacement element or the like can be changed to the direction of an electric field of irradiated controlling light will be described with reference to FIGS. 1A to 1C. When the controlling light is not applied, the solid-state displacement element or the like is in the state shown in FIG. 1B. For example, when controlling light which is linearly polarized is applied to the solid-state displacement element or the like in a direction substantially perpendicular to the lamination direction of the inorganic layered compound, the arrangement of the organic compound in the solid-state displacement element or the like changes into a state shown in FIG. 1A or a state shown in FIG. 1C. In the state shown in FIG. 1A, the plane of polarization of the controlling light (the direction of the applied electric field) is substantially perpendicular to the lamination direction of the inorganic layered compound, and the solid-state displacement element or the like contracts. In the state shown in FIG. 1C, the plane of polarization of the controlling light is substantially parallel to the lamination direction of the inorganic layered compound, and the solid-state displacement element or the like expands. In this way, by changing the direction of the electric field of the linearly polarized light in the controlling light, the expansion state of the solid-state displacement element can be changed.

An example of the case where the organic substance is composed of an organic compound in which the molecular structure or the conformation can be changed depending on the wavelength of irradiated controlling light will be described with reference to FIGS. 2A and 2B. When controlling light having a first wavelength (for example, a wavelength of less than 500 nm) is applied to the solid-state displacement element or the like, the solid-state displacement element or the like expands or contracts in the lamination direction of the inorganic layered compound to be in a first expansion state (the state shown in FIG. 2A). When controlling light having a second wavelength (for example, a wavelength of 500 nm or more) is applied to the solid-state displacement element or the like, the solid-state displacement element or the like expands or contracts in the lamination direction of the inorganic layered compound to be in a second expansion state (the state shown in FIG. 2B) that is different from the first expansion state. The solid-state displacement element or the like may remain in the first expansion state until the controlling light having the second wavelength is applied to the solid-state displacement element or the like, and the solid-state displacement element or the like may remain in the second expansion state until the controlling light having the first wavelength is applied to the solid-state displacement element or the like. Depending on the organic substance, when the controlling light is applied to the solid-state displacement element or the like, the solid-state displacement element or the like may expand or contract in the lamination direction of the inorganic layered compound to be in a first expansion state, and when the controlling light is not applied to the solid-state displacement element or the like, the solid-state displacement element or the like may expand or contract in the lamination direction of the inorganic layered compound to be in a second expansion state that is different from the first expansion state.

Next, the present invention will be described based on examples with reference to the drawings.

EXAMPLE 1

In Example 1, as a starting material for an inorganic layered compound having a layered structure, KTiNbO$_5$ was used, (that is, an inorganic layered compound having a layered structure constituting a solid-state displacement element corresponded to [TiNbO$_5$-]), and as an organic substance, an alkylamine containing an alkyl group having a carbon number of 1 to 16 was used. A process for intercalating the alkylamine in KTiNbO$_5$ will be described below. The crystal structures of KTiNbO$_5$ and so on are shown in FIGS. 3A and 3B and FIG. 4.

Figure 3A:
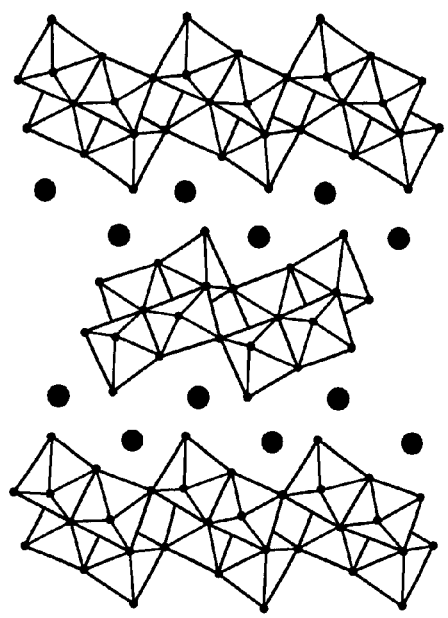
FIGS. 3A and 3B are schematic diagrams which show crystal structures of $KTiNbO_5$ and $HTiNbO_5$, respectively.
Figure 3B:
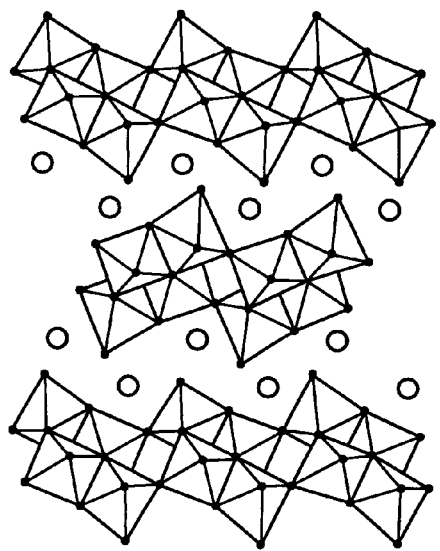
Figure 4:
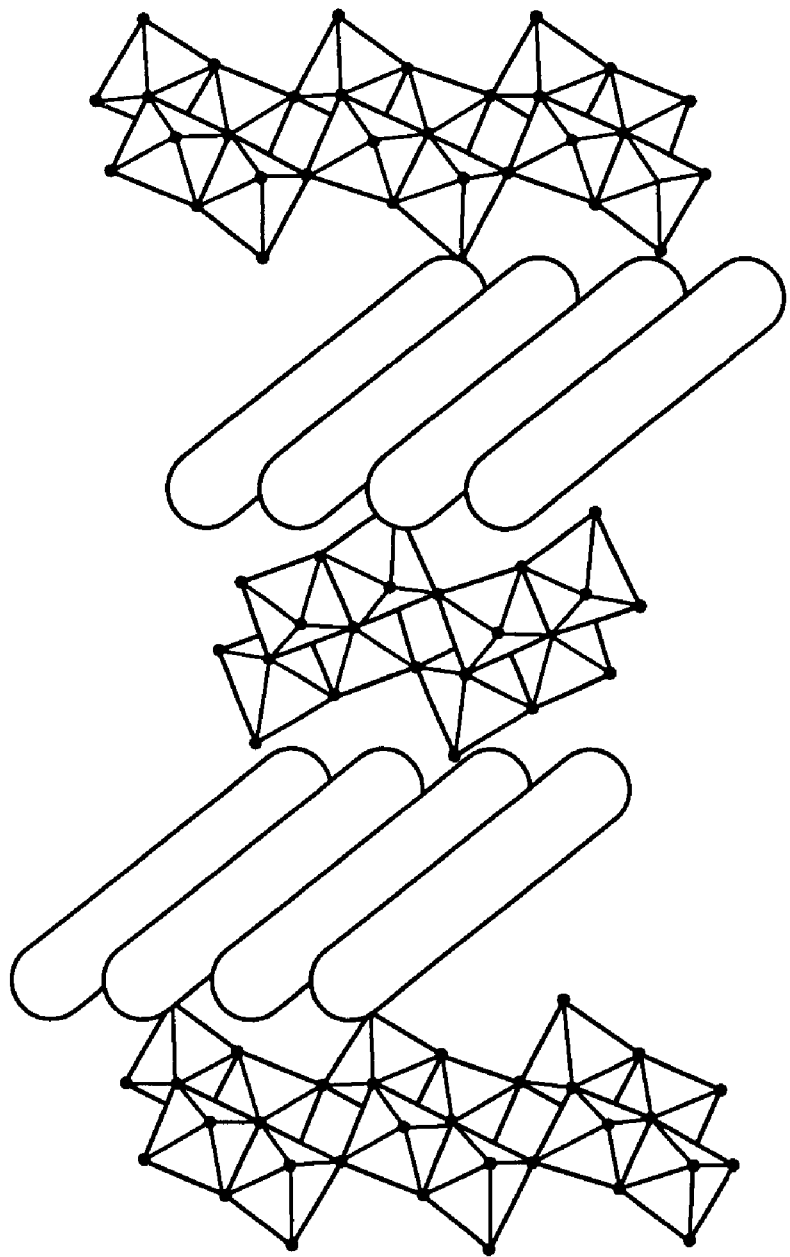
FIG. 4 is a schematic diagram which shows a crystal structure of $RNH_3TiNbO_5$ formed from $HTiNbO_5$ by intercalation.

As shown in FIG. 3A, in the crystal structure of KTiNbO$_5$, zigzag chains of two octahedral sub-lattices having Ti and Nb as central metal ions share vertices to expand as a [TiNbO$_5$-] layer in the A-B plane, and K$^+$ ions (represented by black circles in FIG. 3A) are inserted between layers corresponding to in the c-axis direction so that the charge of the entire compound is kept neutral. Additionally, oxygen atoms are located in the center of the octahedrons. By a solid phase method generally employed, first, KTiNbO$_5$ shown in FIG. 3A is formed, and then, for example, by treatment using hydrochloric acid to promote an ion exchange reaction, HTiNbO$_5$ shown in FIG. 3B is obtained. In FIG. 3B, hydrogen ions are represented by white circles. Next, for example, by intercalating an alkylamine, RNH$_3$TiNbO$_5$ shown in FIG. 4 can be obtained. In FIG. 4, the rounded-end rods represent alkylamine molecules.

First, commercially available raw material powders of K$_2$CO$_3$, TiO$_2$, and Nb$_2$O$_5$ were prepared at a molar ratio of 1:1:1 and were thoroughly mixed, and then calcining was performed at 900° C. for 24 hours, followed by pulverization. The above step was repeated three times and a single-phase sample of KTiNbO$_5$ was obtained. Next, the sample was immersed in 2N-hydrochloric acid for 1 hour at 60° C. to replace potassium with hydrogen, and substantially perfect HTiNbO$_5$ powder was obtained.

Next, intercalation of an alkylamine corresponding to an organic straight-chain amine was performed. Intercalation methods will be described according to the carbon number of the alkylamine since solvents to be used, etc. differ.

[Carbon Number: 1 to 5]

As the solvent, pure water was used, 0.05 mole/liter of HTiNbO$_5$ was prepared in 1 mole of amine solution, and stirring was performed at room temperature for 2 hours, followed by drying at room temperature for 3 days.

[Carbon Number: 8 and 10]

As the solvent, a mixture of pure water and ethanol at a volume ratio of 1:1 was used, 0.05 mole/liter of HTiNbO$_5$ was prepared in 1 mole of amine solution, and stirring was performed at room temperature for 2 hours, followed by drying at room temperature for 3 days.

[Carbon Number: 12 and 16]

As the solvent, a mixture of pure water and ethanol at a volume ratio of 1:1 was used, 0.05 mole/liter of HTiNbO$_5$ was prepared in 1 mole of amine solution, and stirring was performed at room temperature for 2 hours. Immediately after that, sedimentation was accelerated using a centrifugal separator for 10 minutes, and a supernatant liquid was discharged, followed by drying at room temperature for 2 days.

Observations were made with a scanning electron microscope with respect to KTiNbO$_5$, HTiNbO$_5$, and C$_3$H$_7$NH$_3$TiNbO$_5$ (C=3) obtained as described above, and it was found that the particle sizes of all of the three materials were a little less than 1 μm and that C$_3$H$_7$NH$_3$TiNbO$_5$ was particularly more scaly.

Figure 5:
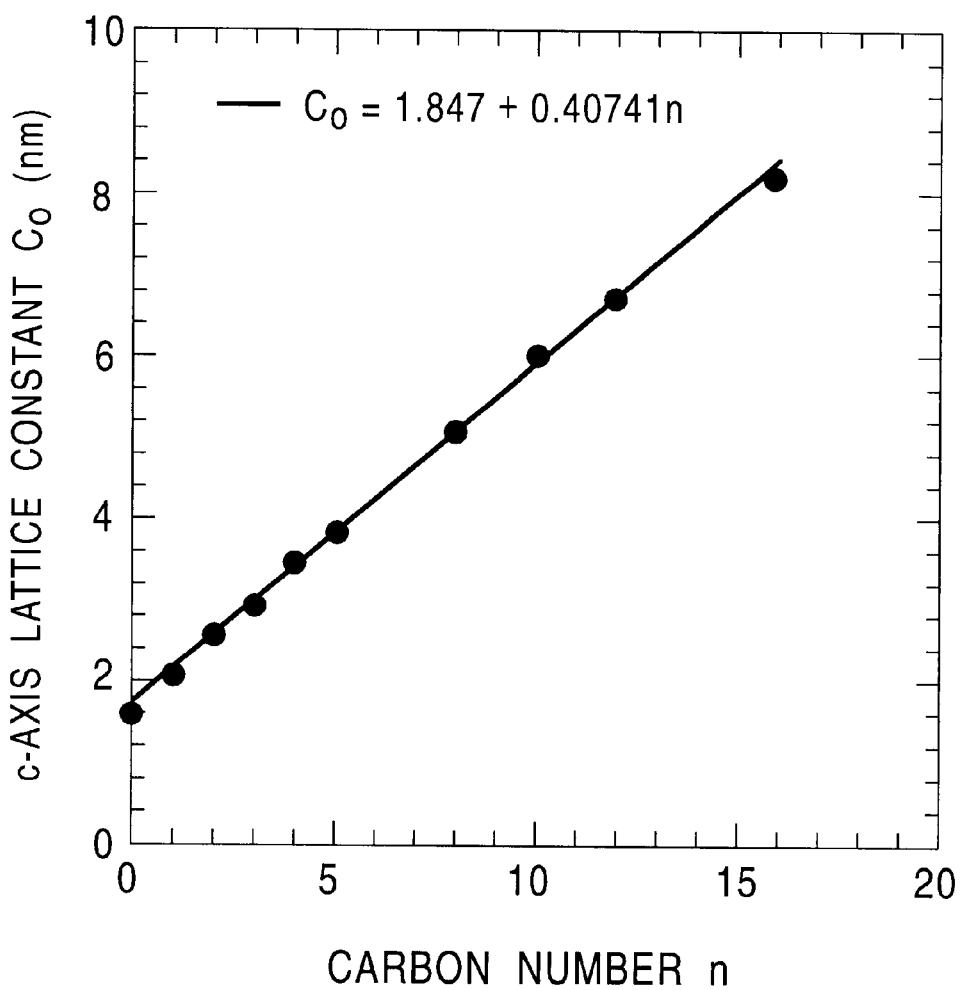
FIG. 5 is a graph which shows a change in c-axis lattice constant as the carbon number increases with respect to an intercalation compound in which an organic substance is inserted between layers of an inorganic layered compound having a layered structure.

With respect to the intercalation compounds formed as described above in which the organic substances were inserted between layers of the inorganic layered compound having the layered structure, the change in c-axis lattice constant relative to an increase in carbon number is shown in FIG. 5.

As the carbon number increased from 1 to 16, the c-axis lattice constant of the intercalation compound increased from 1.7 nm to 8.2 nm, that is by 4 times or more. Such results were not known at carbon numbers 12 and 16, and the relationship between the c-axis lattice constant C$_0$ and the carbon number n enabled a linear approximation and was expressed by the following equation.

$$C_0=1.847+0.40741n \qquad (1)$$

EXAMPLE 2

A formation process of single-crystal KTiNbO$_5$ having the same composition as that in Example 1 is summarized in Table 1 below. With respect to firing, three conditions, i.e., "Condition A", "Condition B", and "Condition C", were established and the firing condition for obtaining the best single crystal was investigated.

TABLE 1

| (1) Weighing: | |
| --- | --- |
| K$_2$CO$_3$ (Purity: 99.99%) | 0.1 mole (13.819 grams) |
| TiO$_2$ (Purity: 99.99%) | 0.2 mole (15.980 grams) |
| Nb$_2$O$_5$ (Purity: 99.99%) | 0.1 mole (26.584 grams) |
| (2) Pulverization | |
| Small ball mill was used | |
| Solvent used: | Ethanol |
| Pulverizing time: | 20 hours |
| (3) Calcining | |
| 1,100° C., 5 hours, in air | |
| (4) Pulverization | |
| (5) Molding | |
| Using a mold having a diameter of 12 mm, 1 gram of pulverized material was pressed for 1 minute at a pressure of 500 grams/cm$^2$. | |
| (6) Firing | |
| [Condition A] | 1,250° C., 5 hours, in air |
| [Condition B] | 1,400° C., 5 hours, in air |
| [Condition C] | 1,500° C., 5 hours, in air |
| (7) Slow cooling | |
| At 10° C./hour from firing temperature to 1,150° C. (in air) | |

Additionally, when firing was performed, the green compact was placed in a 20 ml platinum crucible, and the platinum crucible was placed in an alumina crucible with a size larger than the platinum crucible and was sealed with an alumina cover. A box electric furnace was used for firing, and the temperature was raised to the firing temperature at a rate of 300° C./hour.

With respect to the sample obtained by firing under the condition A, namely, at 1,250° C. for 5 hours, although crystals were precipitated in the platinum crucible after firing, the entire crystals were yellowish probably due to a large amount of unreacted substances remaining. With respect to the sample obtained by firing under the condition B, namely, at 1,400° C. for 5 hours, a large amount of crystals was precipitated in the platinum crucible after firing, and the crystal size was larger than that under the condition A, and also transparency improved. In contrast, in firing under the condition C, namely, at 1,500° C. for 5 hours, nothing remained in the platinum crucible after firing.

In view of the precipitation state of crystals described above, among the three firing conditions, the condition B, namely, firing at 1,400° C. for 5 hours, was the optimum firing condition. The single-crystal KTiNbO$_5$ obtained under this condition was generally shaped like a sheet or a rectangular parallelepiped several hundred by several hundred micrometers square, and some crystals had a length of 1 to 3 mm, a width of 2 to 3 mm, and a thickness of 1 to 2 mm. The transparency of the crystal was considered more satisfactory as letters under the crystal were more clearly seen through the crystal.

Figure 6:
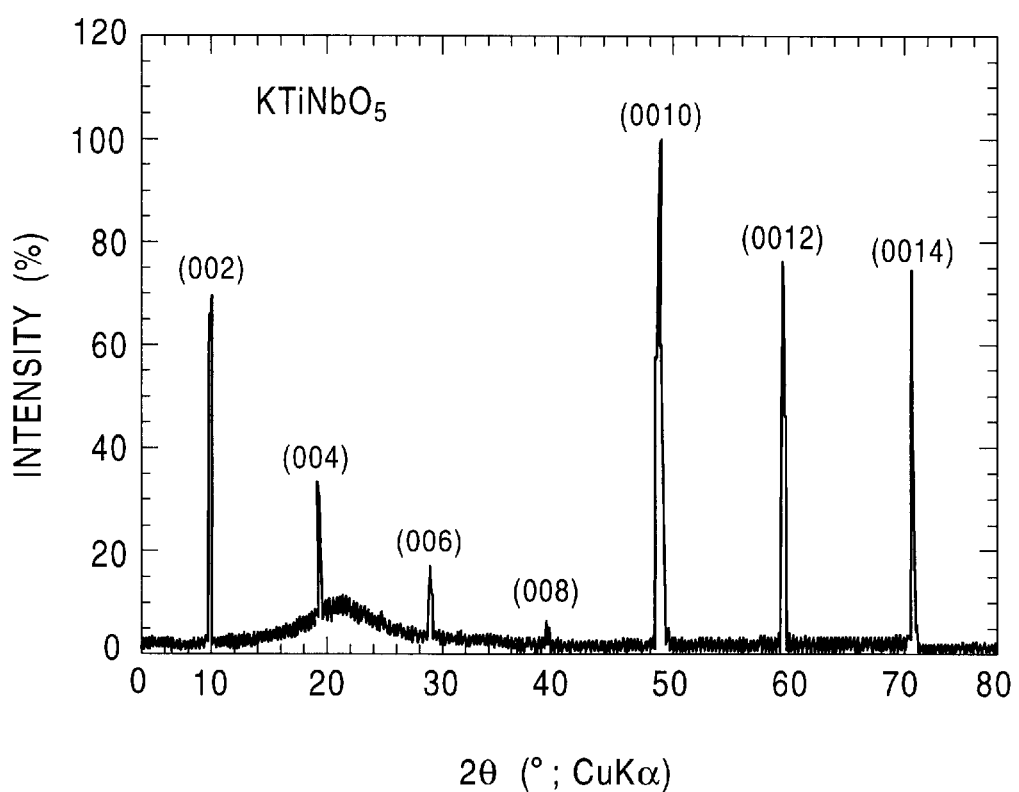
FIG. 6 shows an X-ray diffraction pattern of single-crystal KTiNbO$_5$.

FIG. 6 shows an X-ray diffraction pattern of a section of the single crystal. Broad diffraction in the vicinity of a diffraction angle 2θ of 20° occurred because a very small crystal section was targeted and the redundant X-ray beam was applied to glass as a substrate holder. A c-axis lattice constant of approximately 1.80 nm was obtained by calculation based on the low-angle (002) diffraction.

Figure 7:
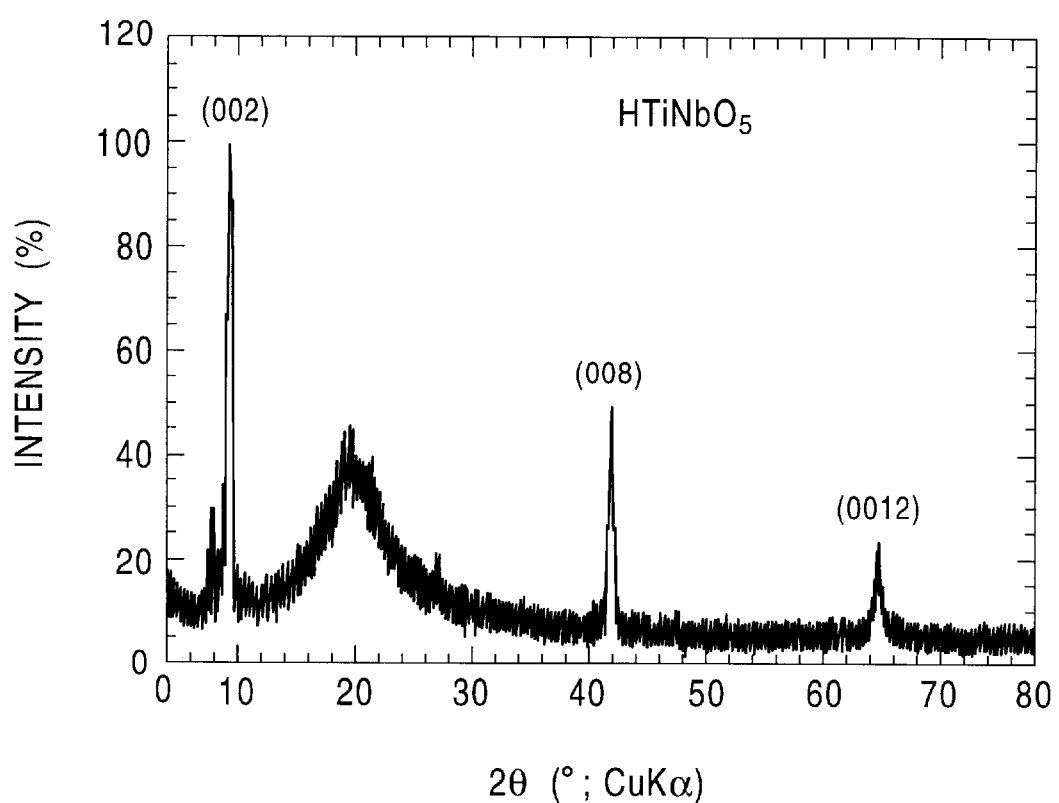
FIG. 7 shows an X-ray diffraction pattern of single-crystal HTiNbO$_5$.

Furthermore, the KTiNbO$_5$ crystal obtained under the condition B was immersed in 2N-hydrochloric acid for 2 weeks at room temperature. Although the HTiNbO$_5$ crystal thus obtained had a shape that was not greatly different from that of the original KTiNbO$_5$ crystal, the transparency of the crystal was slightly decreased. The shape of the crystal very often became more rectangular by the immersion in hydrochloric acid due to an etching effect or exfoliation of the layered structure. FIG. 7 shows an X-ray diffraction pattern of a section of the HTiNbO$_5$ single crystal. Additionally, although an X-ray powder diffraction pattern showed a mixture of HTiNbO$_5$ as the principal phase and KTi$_3$NbO$_9$ as the by-product phase, herein observations were carried out using a section of the targeted HTiNbO$_5$ single crystal.

The broad diffraction in the drawing also resulted from the glass as the substrate holder. A c-axis lattice constant of approximately 1.72 nm was obtained by calculation based on the low-angle (002) diffraction.

Figure 8:
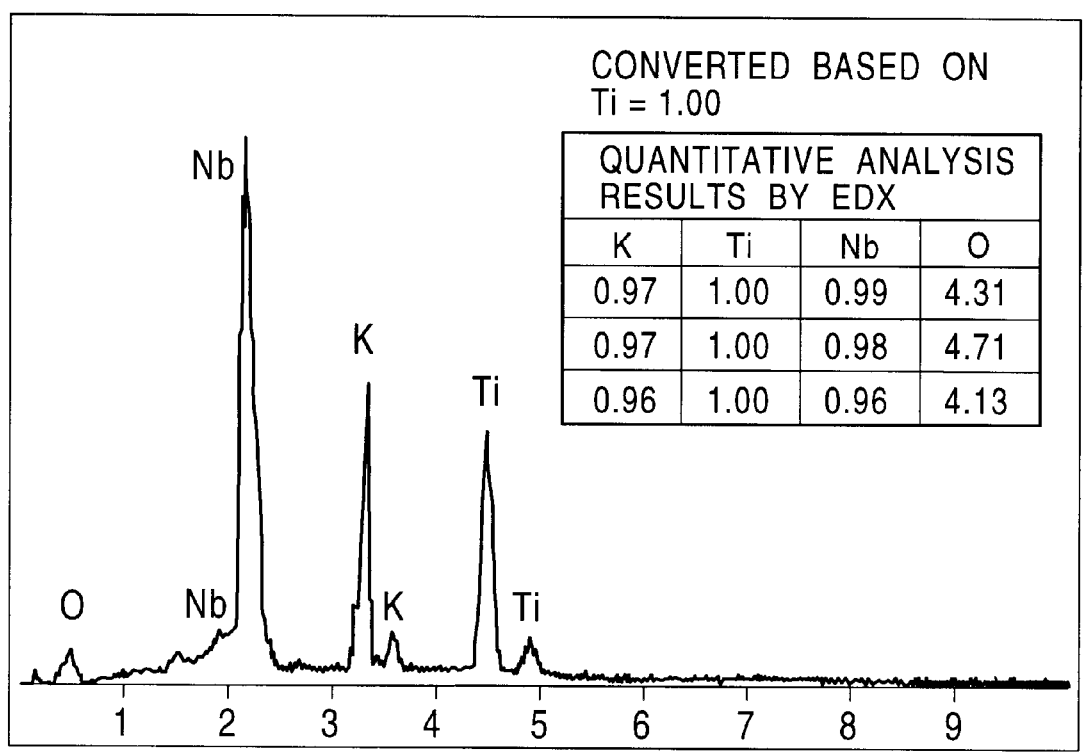
FIG. 8 shows results of quantitative analysis of KTiNbO$_5$ crystals analyzed by EDX.
Figure 9:
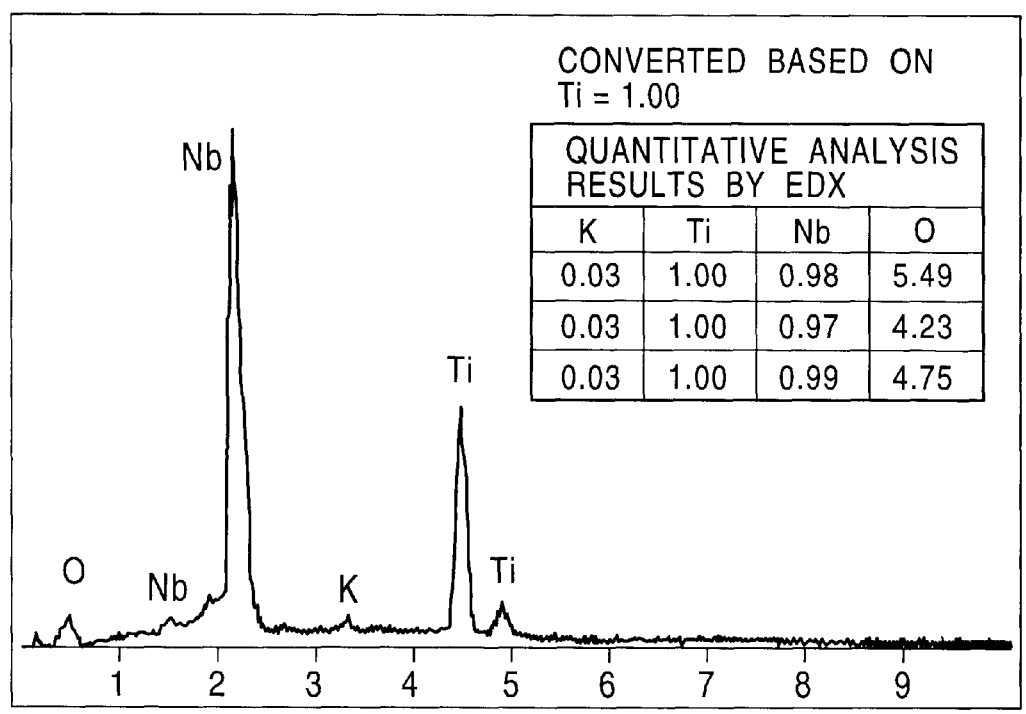
FIG. 9 shows results of quantitative analysis by EDX of a sample which is obtained by immersing KTiNbO$_5$ crystals produced under a condition B in 2N-hydrochloric acid for 6 days at room temperature.

Furthermore, the KTiNbO$_5$ crystal obtained under the condition B was immersed in 2N-hydrochloric acid for 6 days at room temperature. The composition of a sample thus obtained was analyzed by energy dispersive X-ray spectoroscopy (EDX). FIG. 9 shows results of quantitative analysis thereof. FIG. 8 shows results of quantitative analysis by EDX of the composition of the KTiNbO$_5$ crystal.

While a potassium peak (K) was of course observed in the KTiNbO$_5$ crystal, the potassium peak (K) almost disappeared in the sample after immersion in hydrochloric acid. According to the quantitative analysis, the KTiNbO$_5$ crystal had a metal composition ratio K:Ti:Nb of 0.97:1:0.98. In contrast, the sample after immersion in hydrochloric acid had a metal composition ratio K:Ti:Nb of 0.03:1:0.98. Thus, it was confirmed that potassium was removed almost completely.

Figure 10:
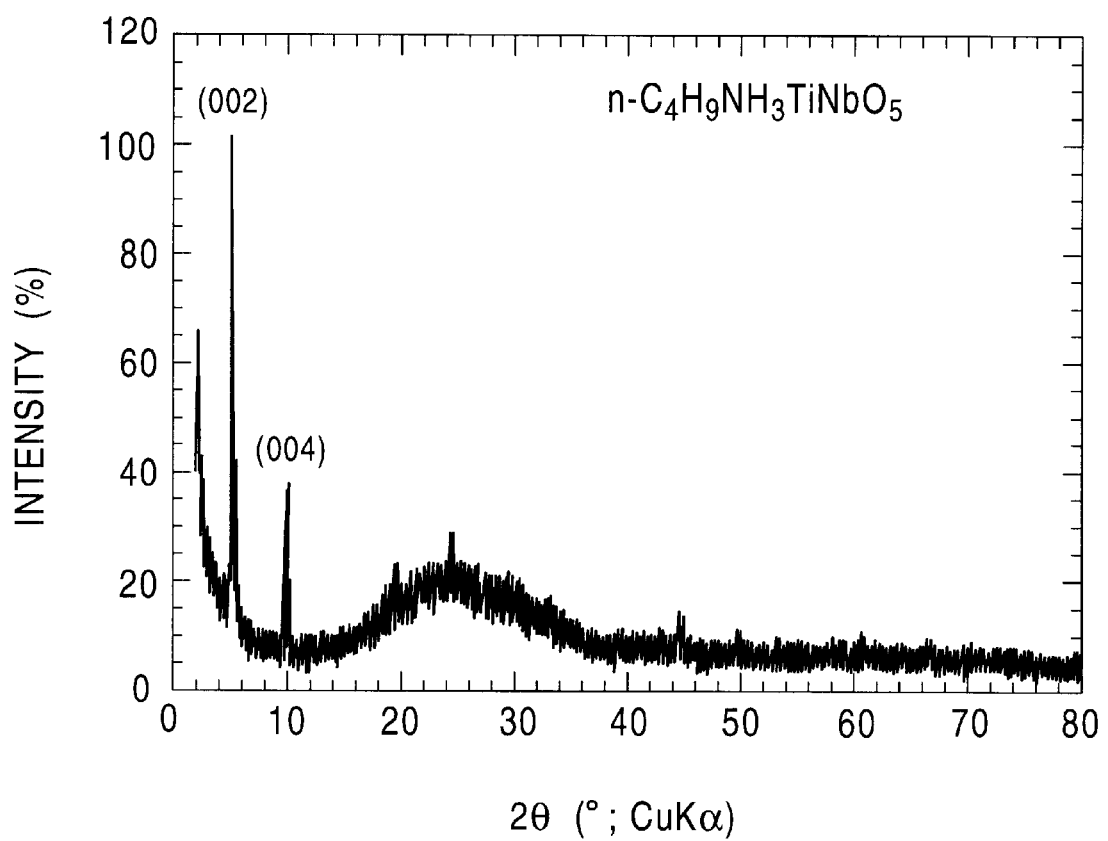
FIG. 10 shows an X-ray diffraction pattern of n-C$_4$H$_9$NH$_3$TiNbO$_5$.

Using the thin section of the HTiNbO$_5$ single crystal obtained as described above, n-butylamine (carbon number: 4) was intercalated. Pure water was used as a solvent, 1 mole of n-butylamine was prepared, and an intercalation reaction was caused for 3 days at room temperature while the molar ratio of n-butylamine to HTiNbO$_5$ was set excessively large. The resulting substance was an intercalation compound (n-C$_4$H$_9$NH$_3$TiNbO$_5$) in which an organic substance was inserted between layers of an inorganic layered compound having a layered structure. FIG. 10 shows an X-ray diffraction pattern thereof. No great change in shape was observed after the intercalation reaction, and the intercalation compound had a shape satisfactorily usable as a solid-state driving element or an optical element.

EXAMPLE 3

Example 3 relates to a solid-state displacement element and an optical element of the present invention. In Example 3, the alkylamine-based intercalation compound (n-C$_4$H$_9$NH$_3$TiNbO$_5$) obtained in Example 2 was used. Additionally, n-C$_4$H$_9$NH$_3$TiNbO$_5$ is an organic compound in which the arrangement in an optical element 10 can be changed in the direction of an electric field of irradiated controlling light.

FIGS. 11 and 12 are schematic diagrams of an optically-controlled device provided with an optical element of the present invention. The optically-controlled device includes a polarizer 11, an analyzer 12, an optical element 10 located between the polarizer 11 and the analyzer 12, and a light source (not shown in the drawing) for applying controlling light to the optical element 10. The polarizer 11 and the analyzer 12 are disposed orthogonally to each other, in a so-called "crossed Nicol" manner. The optical element 10 is disposed so that the lamination direction of the inorganic layered compound of the n-C$_4$H$_9$NH$_3$TiNbO$_5$ single crystal constituting the optical element 10 (the c-axis direction of the optical element 10) is substantially aligned with the optical axis of light entering the polarizer 11.

Light transmitted through the polarizer 11 is applied to the optical element 10 substantially in the lamination direction of the inorganic layered compound constituting the optical element 10 (in the c-axis direction of the crystal of the optical element 10). The transmitted light linearly polarized by the polarizer 11 enters the optical element 10. Controlling light is also applied to the optical element 10 in the direction substantially perpendicular to the lamination direction of the inorganic layered compound. That is, linearly polarized controlling light is applied to the optical element 10 in the direction substantially perpendicular to the lamination direction of the inorganic layered compound. FIG. 11 shows a state in which the polarization vector of the controlling light is perpendicular to the lamination direction of the inorganic layered compound, and FIG. 12 shows a state in which the polarization vector of the controlling light is parallel to the lamination direction of the inorganic layered compound. In FIG. 11, the optical element 10 contracts in the lamination direction of the inorganic layered compound as shown in FIG. 1A. In FIG. 12, the optical element 10 expands in the lamination direction of the inorganic layered compound as shown in FIG. 1C. When the optical element 10 expands, the optical anisotropy of the organic substance constituting the optical element 10 is lost with respect to the optical axis of the transmitted light passing through the optical element 10, (that is, the optical anisotropy of the crystal of the optical element 10 in the c-axis direction is lost), and therefore the polarization direction of the transmitted light is the same as that of light entering the optical element 10. Consequently, the intensity of light passed through the analyzer 12 is significantly weak. However, when the optical element 10 contracts, optical anisotropy occurs in the organic substance in the direction perpendicular to the lamination direction of the inorganic layered compound, (that is, optical anisotropy occurs in the A-B plane of the crystal of the optical element 10), and therefore the polarization direction of the transmitted light passing through the optical element 10 is changed. Consequently, the intensity of light emitted from the analyzer 12 is significantly increased. In this way, when controlling light is applied to the optical element 10, the optical element 10 expands or contracts in the lamination direction of the inorganic layered compound, thus enabling the modulation of the polarization of the transmitted light passing through the optical element 10. Additionally, such a phenomenon is referred to as an optical Kerr effect, which has been well known with respect to liquids including liquid crystals. However, with respect to solids, since a large displacement in the atomic position has not been expected merely by an electric field by polarization, the use thereof has not been implemented.

Figure 13A:
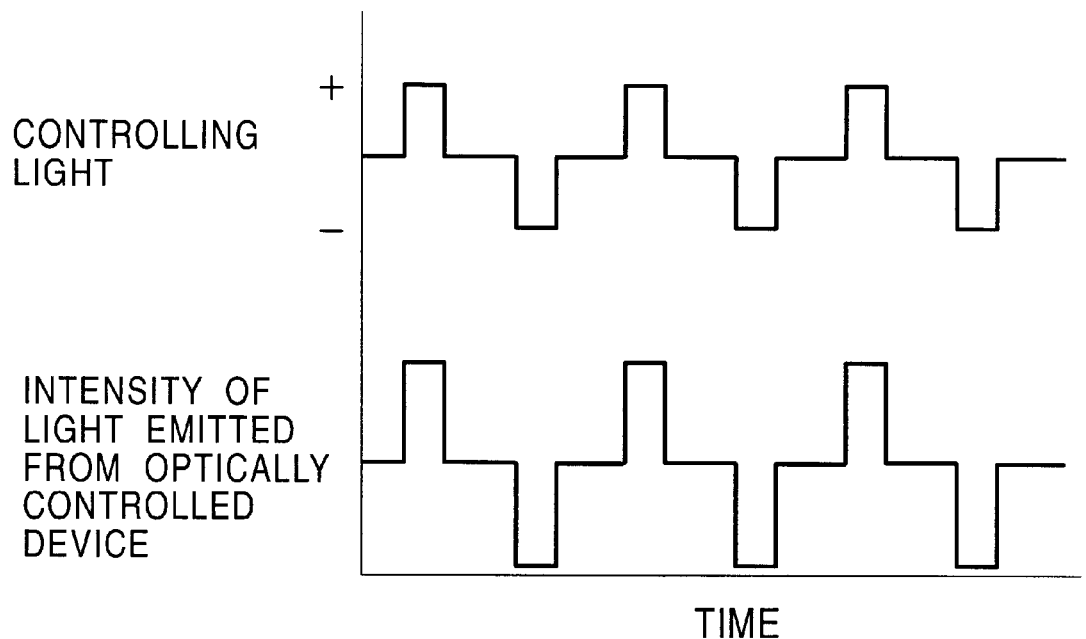
FIGS. 13A and 13B show the relationships between controlling light and intensities of light emitted from optically-controlled devices.

FIG. 13A schematically shows the relationship between controlling light and intensity of light emitted from an optically-controlled device. In FIG. 13A, symbol + represents a state in which the polarization vector of the controlling light is perpendicular to the lamination direction of the inorganic layered compound, and symbol − represents a state in which the polarization vector of the controlling light is parallel to the lamination direction of the inorganic layered compound.

Additionally, by substituting a solid-state displacement element for the optical element described above, the solid-state displacement element of the present invention or the operation thereof is described. Therefore, a description of the solid-state displacement element of the present invention will be omitted.

EXAMPLE 4

Example 4 is a variation on Example 3. In Example 4, as the organic substance, an organic compound in which the conformation or the molecular structure could be changed depending on the wavelength of irradiated controlling light was used. Specifically, an optical element was composed of $(C_6H_5)_2N_2TiNbO_5$ formed based on azobenzene and $KTiNbO_5$. The structure of an optically-controlled device was the same as that in Example 3. The direction of incidence of controlling light to an optical element 10 can be set in any direction, which is different from Example 3.

Light transmitted through a polarizer 11 is applied to the optical element 10 substantially in the lamination direction of the inorganic layered compound constituting the optical element 10 (in the c-axis direction of the crystal of the optical element 10). The transmitted light linearly polarized by the polarizer 11 enters the optical element 10. Controlling light is also applied to the optical element 10, for example, in the direction substantially perpendicular to the lamination direction of the inorganic layered compound. At this stage, the optical element expands or contracts in the lamination direction of the inorganic layered compound to be in a first expansion state. When controlling light is not applied to the optical element, the optical element expands or contracts in the lamination direction of the inorganic layered compound to be in a second expansion state that is different from the first expansion state. Depending on the organic substance constituting the optical element, when controlling light having a first wavelength is applied to the optical element 10, the optical element 10 expands or contracts in the lamination direction of the inorganic layered compound to be in the first expansion state (refer to FIG. 2A). When controlling light having a second wavelength is applied to the optical element 10, the optical element 10 expands or contracts in the lamination direction of the inorganic layered compound to be in the second expansion state that is different from the first expansion state (refer to FIG. 2B). The optical element 10 remains in the first expansion state until the controlling light having the second wavelength is applied to the optical element 10, and the optical element 10 remains in the second expansion state until the controlling light having the first wavelength is applied to the optical element 10. That is, the solid-state displacement element or the optical element 10 is provided with a memory function.

When the optical element 10 expands, the optical anisotropy of the organic substance constituting the optical element 10 is lost with respect to the optical axis of the transmitted light passing through the optical element 10, and therefore the polarization direction of the transmitted light is the same as that of light entering the optical element 10. Consequently, the intensity of light passed through the analyzer 12 is significantly weak. However, when the optical element 10 contracts in the lamination direction of the inorganic layered compound, optical anisotropy occurs in the organic substance in the direction perpendicular to the lamination direction of the inorganic layered compound, and therefore the polarization direction of the transmitted light passing through the optical element 10 can be changed. Consequently, the intensity of light emitted from the analyzer 12 is significantly increased. As described above, by applying two types of controlling light having different wavelengths to an optical element, the optical element expands or contracts in the lamination direction of the inorganic layered compound, and thus the polarization of the transmitted light passing through the optical element can be modulated. Moreover, the optical element is provided with a memory function.

Figure 13B:
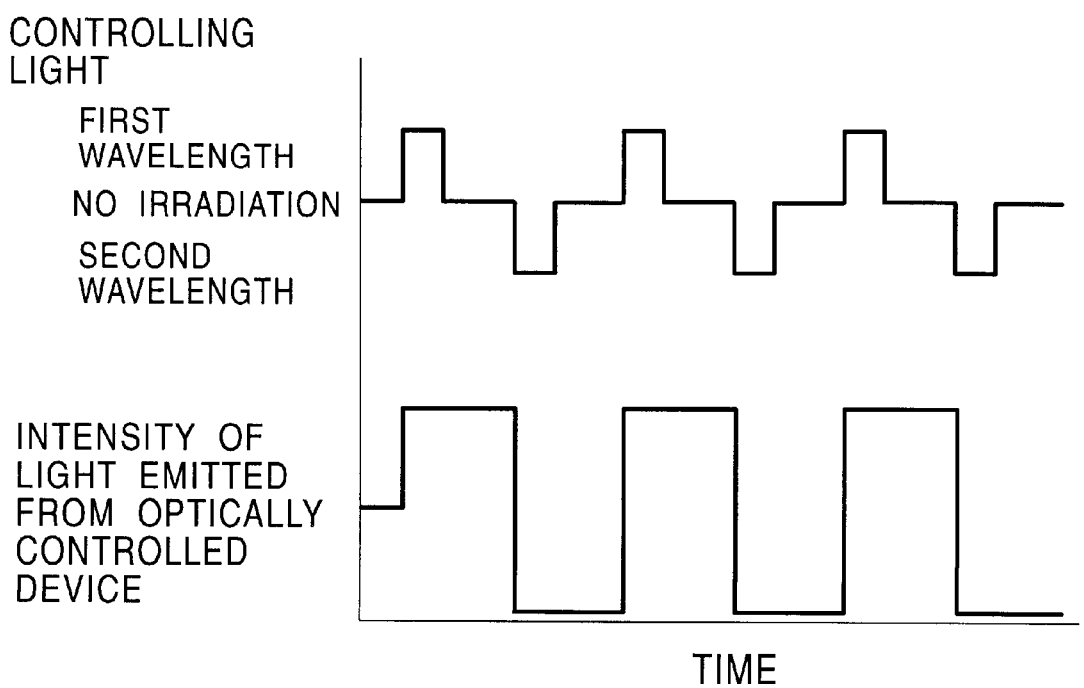

FIG. 13B schematically shows the relationship between the controlling light and the intensity of light emitted from the optically-controlled device in the optical element 10 provided with a memory function.

EXAMPLE 5

Figure 14A:
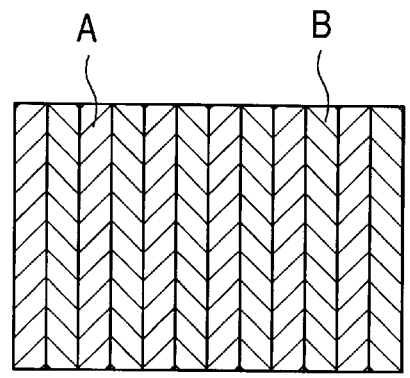
FIGS. 14A to 14C are partial sectional views which schematically show interference filters.
Figure 15A:
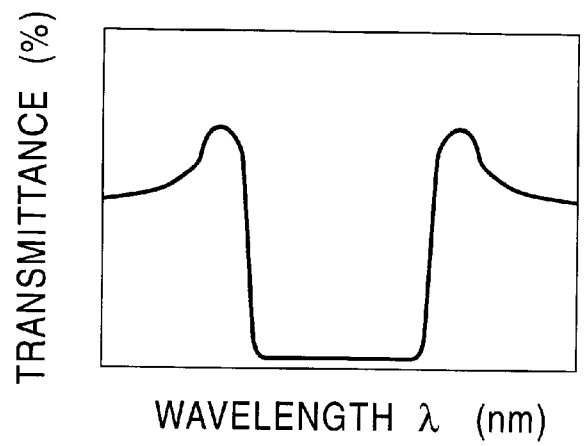
FIGS. 15A to 15C are diagrams which schematically show the relationships between transmittance and wavelength with respect to interference filters.

Example 5 relates to an interference filter of the present invention. As schematically shown in a partial sectional view of FIG. 14A, by depositing a dielectric film A and a dielectric film B alternately on a transparent substrate (not shown in the drawing) to form a periodic structure, an interference filter can be fabricated which transmits or reflects only light in a predetermined wavelength region according to its optical design as schematically shown in FIG. 15A. That is, in a transmission interference filter which transmits only light in a predetermined wavelength region, light in a wavelength region other than the predetermined wavelength region is reflected by the interference filter and only light in the predetermined wavelength region passes through the interference filter. In a reflection interference filter which reflects only light in a predetermined wavelength region, light in a wavelength region other than the predetermined wavelength region passes through the interference filter and only light in the predetermined wavelength region is reflected by the interference filter. As materials constituting dielectric films, $SiO_2$, $TiO_2$, $CeO_2$, $ZrO_2$, $MgF_2$, $CaF_2$, $SnO2$, $ZnO$, $In_2O_3$, etc. may be used in various combinations. Additionally, the periodic structure in which the dielectric film A and the dielectric film B are alternately deposited is often referred to as a "one-dimensional photonic crystal".

Figure 14B:
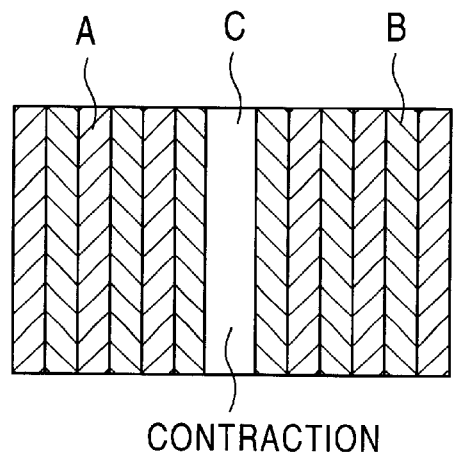
Figure 14C:
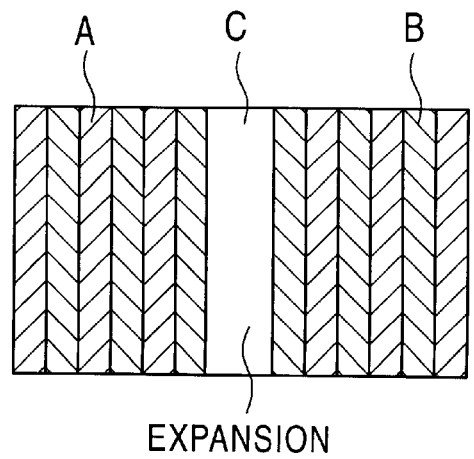

An interference filter in Example 5 includes multilayered films composed of dielectric films A and B and a solid-state displacement thin film C disposed between the multilayered films as schematically shown in a partial sectional view of FIG. 14B. The interference filter transmits or reflects only light in a predetermined wavelength region. The solid-state displacement thin film C includes an inorganic layered compound and an organic substance inserted between layers of the inorganic layered compound. When controlling light is applied to the interference filter, the solid-state displacement thin film C expands or contracts in the lamination direction of the inorganic layered compound (refer to FIGS. 14B and 14C), and a dielectric constant tensor thereof changes, and therefore the wavelength region of light passing through or reflected by the interference filter changes.

The solid-state displacement thin film C may be composed of, for example, the intercalation compound described in Examples 2 and 4. That is, the organic substance may be selected from organic compounds in which the arrangement in the interference filter can be changed in the direction of an electric field of irradiated controlling light. In such a case, preferably, the controlling light is applied to the interference filter in a direction substantially perpendicular to the lamination direction of the inorganic layered compound, or linearly polarized controlling light may be applied to the interference filter in the direction substantially perpendicular to the lamination direction of the inorganic layered compound. Alternatively, the organic substance may be selected from organic compounds in which the molecular structure or the conformation can be changed depending on the wavelength of the irradiated controlling light. In such a case, depending on the organic substance constituting the interference filter, the interference filter expands or contracts in the lamination direction of the inorganic layered compound to be in a first expansion state, and when the controlling light is not applied to the interference filter, the interference filter expands or contracts in the lamination direction of the inorganic layered compound to be in a second expansion state. Depending on the organic substance constituting the interference filter, when controlling light having a first wavelength is applied to the interference filter, the interference filter expands or contracts in the lamination direction of the inorganic layered compound to be in the first expansion state, and when controlling light having a second wavelength is applied to the interference filter, the interference filter expands or contracts in the lamination direction of the inorganic layered compound to be in the second expansion state that is different from the first expansion state. The interference filter remains in the first expansion state until the controlling light having the second wavelength is applied to the interference filter, and the interference filter remains in the second expansion state until the controlling light having the first wavelength is applied to the interference filter.

Figure 15B:
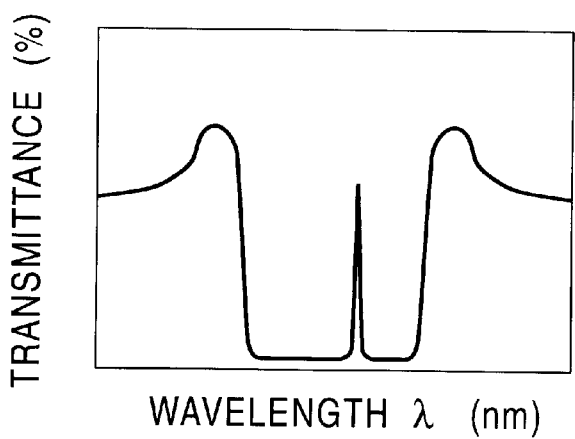
Figure 15C:
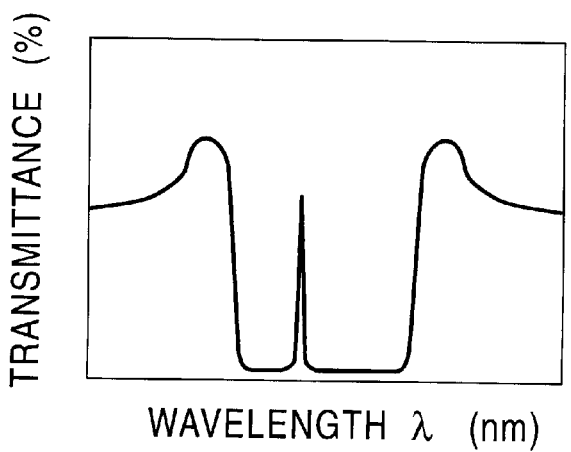

Specifically, the dielectric film A is composed of $SiO_2$ and the dielectric film B is composed of $TiO_2$. A solid-state displacement thin film C composed of an intercalation compound is inserted between a multilayered film with a structure of ABABABAB . . . to form, for example, a structure of ABABABCBABABA. Consequently, a wavelength (spike wavelength) which partially transmits or reflects in a wavelength region in which the interference filter does not usually transmit light can be obtained. By irradiating the interference filter with controlling light in a manner similar to that described in Examples 3 and 4, the interference filter is in a state shown in FIG. 14B or 14C, and since the relative dielectric constant (dielectric constant tensor) of the solid-state displacement thin film C in the lamination direction of the inorganic layered compound changes, the spike wavelength can be moved as shown in FIGS. 15B and 15C. The state shown in FIG. 14B corresponds to FIG. 15B and the state shown in FIG. 14C corresponds to FIG. 15C. This interference filter modulates light by wavelength selection and can be used in a manner similar to that of an optical transistor.

The interference filter may be fabricated, for example, by a method described below. That is, after a multilayered film including dielectric films A and dielectric films B is formed on a transparent substrate by vapor deposition or sputtering, an inorganic layered compound having a layered structure is formed on the multilayered film using a thin-film deposition technique such as sputtering, MBE, MOCVD, a sol-gel process, pulsed laser ablation, or spin-coating. By inserting (intercalating) an organic substance between layers of the inorganic layered compound, a solid-state displacement thin film C is formed. A multilayered film including dielectric films A and dielectric films B is deposited again on the solid-state displacement thin film C by vapor deposition or sputtering.

The present invention is not limited to the examples described above. The various materials and substances, methods of fabricating the solid-state displacement elements or the like, the fabricating conditions, the structures of the optical elements and the interference filters described above are examples and may be altered appropriately. The solid-state displacement element of the present invention can also be applied to components for optical integrated circuits in addition to optical elements and interference filters. The present invention is also applicable to coatings for entertainment goods such as artificial skin having interference color. In such a case, the coating is composed of an intercalation compound containing an organic compound in which the molecular structure or the conformation can be changed depending on the wavelength of irradiated controlling light. The intercalation compound is uniformly applied to the exterior of a product, and when controlling light with different intensity is applied to the coating, the surface of the coating has minute unevenness due to interference effect and the coating assumes interference color.

In the present invention, the organic substance may be a mixture of an organic compound in which the arrangement in the solid-state displacement element or the like can be changed in the direction of an electric field of controlling light and an organic compound in which the molecular structure or the conformation can be changed depending on the wavelength of the irradiated controlling light, or may be an organic compound in which molecules constituting an organic compound in which the arrangement in the solid-state displacement element or the like can be changed in the direction of an electric field of controlling light and molecules constituting an organic compound in which the molecular structure or the conformation can be changed depending on the wavelength of the irradiated controlling light are chemically bonded.

In accordance with the present invention, since the expansion and contraction of the solid-state displacement element, the optical element, or the interference filter are controlled by light irradiation, the control system can be simplified. That is, in the light irradiation method, a light source for the controlling light can be always set so as to have a predetermined size or intensity, which is highly advantageous. Since the generated force of the solid-state displacement element or the like can be modulated by the electric field intensity of controlling light, superior controllability can be obtained. The advantages of the light irradiation method are summarized as follows.

(A) Any given light source which is a driving system can be selected.

(B) Complex peripheral components, such as electrodes and wiring, are not required, which is different from a method in which displacement or operation of a solid-state displacement element or the like is controlled based on an electric field.

(C) A solid-state displacement element or the like placed in an enclosed space can be displaced (expanded or contracted) by being directly irradiated with a laser beam or the like from outside.

If an organic compound in which the arrangement in the solid-state displacement element or the like can be changed in the direction of an electric field of irradiated controlling light is used as the organic substance, since the solid-state displacement element or the like is expanded or contracted in the polarization direction of the controlling light, controllability on the expansion and contraction of the solid-state displacement element or the like is significantly simplified and controlling can be performed easily. On the other hand, if an organic compound in which the molecular structure or the conformation can be changed depending on the wavelength of irradiated controlling light is used as the organic substance, since the molecular structure or the conformation of the intercalated organic substance changes, a memory effect can be attached to the expansion and contraction of the solid-state displacement element or the like. Moreover, since two types of controlling light having different wavelengths are simply applied to the solid-state displacement element or the like, external ambient light rarely causes noise.

What is claimed is:

1. A solid-state displacement element comprising an inorganic layered compound having a plurality of inorganic layers and an organic substance intercalated between the inorganic layers, wherein the solid-state displacement element expands or contracts in the lamination direction of the inorganic layered compound when irradiated with controlling light.

2. A solid-state displacement element according to claim 1, wherein the organic substance comprises an organic compound, the arrangement of the organic compound changes in the direction of an electric field of the irradiated controlling light, and the solid-state displacement element expands or contracts in the lamination direction of the inorganic layered compound in response to changes in the arrangement of the organic compound.

3. A solid-state displacement element according to claim 2, wherein the controlling light is applied to the solid-state displacement element in a direction substantially perpendicular to the lamination direction of the inorganic layered compound.

4. A solid-state displacement element according to claim 2, wherein when linearly polarized controlling light is applied to the solid-state displacement element in a direction substantially perpendicular to the lamination direction of the inorganic layered compound, the solid-state displacement element expands or contracts in the lamination direction of the inorganic layered compound depending on the direction of the electric field of the linearly polarized light.

5. A solid-state displacement element according to claim 1, wherein the organic substance comprises an organic compound, the molecular structure or the conformation of the organic compound changes depending on the wavelength of the irradiated controlling light, and the solid-state displacement element expands or contracts in the lamination direction of the inorganic layered compound in response to changes in the structure or the conformation of the organic compound.

6. A solid-state displacement element according to claim 5, wherein when controlling light having a first wavelength, is applied to the solid-state displacement element, the solid-state displacement element expands or contracts in the lamination direction of the inorganic layered compound to be in a first expansion state; when controlling light having a second wavelength is applied to the solid-state displacement element, the solid-state displacement element expands or contracts in the lamination direction of the inorganic layered compound to be in a second expansion state that is different from the first expansion state; the solid-state displacement element remains in the first expansion state until the controlling light having the second wavelength is applied to the solid-state displacement element; and the solid-state displacement element remains in the second expansion state until the controlling light having the first wavelength is applied to the solid-state displacement element.

7. A solid-state displacement element according to claim 1, wherein the organic substance comprises at least one organic compound selected from the group consisting of an organic compound having at least one of an aliphatic carbon-carbon bond, an aromatic ring, and a heterocyclic ring, wherein at least a part of hydrogen atoms directly bonded to any one of carbon atoms may be replaced by nitrogen or sulfur, and an organic compound in which at least a part of hydrogen atoms directly bonded to carbon atoms constituting a carbon compound is replaced by nitrogen or sulfur.

8. A solid-state displacement element according to claim 7, wherein the organic substance comprises at least one organic compound selected from the group consisting of a chiral liquid crystal, a phenylpyrimidine-based liquid crystal, a phenylpyridine-based liquid crystal, an amine-based liquid crystal, a biphenylpyrimidine-based liquid crystal, an azobenzene-based compound, a porphyrin-based compound, an anthraquinone-based compound, a spiropyran-based compound, a diarylethene-based compound, a stilbene-based compound, a fulgide-based compound, urea, and carbon disulfide.

9. A solid-state displacement element according to claim 7, wherein the organic substance comprises an organic compound and the conformation or the molecular structure of the organic compound can be changed.

10. A solid-state displacement element according to claim 7, wherein the organic substance comprises an organic compound having a polar functional group.

11. A solid-state displacement element according to claim 1, wherein the inorganic layered compound or the inorganic layered compound as a starting material before the organic substance is intercalated between the inorganic layers comprises at least one inorganic layered compound selected from the group consisting of a layered perovskite-type niobium-based compound, a layered perovskite-type copper-based compound, a layered titanoniobate, a layered rock salt-type oxide, a bronze-based compound in a transition metal oxide, a transition metal oxychloride, a layered polysilicate, a layered clay mineral, a hydrotalcite, a transition metal chalcogenide, a zirconium phosphate, and graphite.

12. An optical element comprising an inorganic layered compound having a plurality of inorganic layers and an organic substance intercalated between the inorganic layers, wherein when controlling light is applied to the optical element, the optical element expands or contracts in the lamination direction of the inorganic layered compound, thus modulating the polarization of transmitted light passing through the optical element.

13. An optical element according to claim 12, wherein the organic substance comprises an organic compound, the arrangement of the organic compound changes in the direction of an electric field of the applied controlling light, and the optical element expands or contracts in the lamination direction of the inorganic layered compound in response to changes of the arrangement of the organic compound.

14. An optical element according to claim 13, wherein the controlling light is applied to the optical element in a direction substantially perpendicular to the lamination direction of the inorganic layered compound.

15. An optical element according to claim 13, wherein when linearly polarized controlling light is applied to the optical element in a direction substantially perpendicular to the lamination direction of the inorganic layered compound, the optical element expands or contracts in the lamination direction of the inorganic layered compound depending on the direction of the electric field of the linearly polarized light.

16. An optical element according to claim 12, wherein the organic substance comprises an organic compound, the molecular structure or the conformation of the organic compound changes depending on the wavelength of the applied controlling light, and the optical element expands or contracts in the lamination direction of the inorganic layered compound in response to changes in the structure or the conformation of the organic compound.

17. An optical element according to claim 16, wherein when controlling light having a first wavelength is applied to the optical element, the optical element expands or contracts in the lamination direction of the inorganic layered compound to be in a first expansion state; when controlling light having a second wavelength is applied to the optical element, the optical element expands or contracts in the lamination direction of the inorganic layered compound to be in a second expansion state that is different from the first expansion state; the optical element remains in the first expansion state until the controlling light having the second wavelength is applied to the optical element; and the optical element remains in the second expansion state until the controlling light having the first wavelength is applied to the optical element.

18. An optical element according to claim 12, wherein the transmitted light passing through the optical element enters substantially in the lamination direction of the inorganic layered compound constituting the optical element and is linearly polarized.

19. An interference filter for transmitting or reflecting light in a predetermined wavelength region, the interference filter comprising a multilayered film comprising a dielectric material and a solid-state displacement thin film disposed between layers of the multilayered film,
  wherein the solid-state displacement thin film comprises an inorganic layered compound having a plurality of inorganic layers and an organic substance intercalated between the inorganic layers; and
  when controlling light is applied to the interference filter, the solid-state displacement thin film expands or contracts in the lamination direction of the inorganic layered compound, and a dielectric constant tensor thereof changes, and thus the wavelength region of light passing through or reflected from the interference filter changes.

20. An interference filter according to claim 19, wherein the organic substance comprises an organic compound, the arrangement of the organic compound changes in the direction of an electric field of the applied controlling light, and the interference filter expands or contracts in the lamination direction of the inorganic layered compound in response to changes of the arrangement of the organic compound.

21. An interference filter according to claim 20, wherein the controlling light is applied to the interference filter in a direction substantially perpendicular to the lamination direction of the inorganic layered compound.

22. An interference filter according to claim 20, wherein when linearly polarized controlling light is applied to the interference filter in a direction substantially perpendicular to the lamination direction of the inorganic layered compound, the interference filter expands or contracts in the lamination direction of the inorganic layered compound depending on the direction of the electric field of the linearly polarized light.

23. An interference filter according to claim 19, wherein the organic substance comprises an organic compound, the molecular structure or the conformation of the organic compound changes depending on the wavelength of the applied controlling light, and the interference filter expands or contracts in the lamination direction of the inorganic layered compound in response to changes in the structure or the conformation of the organic compound.

24. An interference filter according to claim 23, wherein when controlling light having a first wavelength is applied to the interference filter, the interference filter expands or contracts in the lamination direction of the inorganic layered compound to be in a first expansion state; when controlling light having a second wavelength is applied to the interference filter, the interference filter expands or contracts in the lamination direction of the inorganic layered compound to be in a second expansion state that is different from the first expansion state; the interference filter remains in the first expansion state until the controlling light having the second wavelength is applied to the interference filter; and the interference filter remains in the second expansion state until the controlling light having the first wavelength is applied to the interference filter.

* * * * *